United States Patent [19]

Honda et al.

[11] Patent Number: 5,216,528
[45] Date of Patent: Jun. 1, 1993

[54] THREE-DIMENSIONAL MULTIPLEX HOLOGRAM

[75] Inventors: Toshio Honda, Kanagawa; Kei Shimura, Ibaraki; Masahiro Yamaguchi; Nagaaki Ohyama, both of Kanagawa; Takayuki Saito, Saitama, all of Japan

[73] Assignee: Fuji Photo Optical Co., Ltd., Saitama, Japan

[21] Appl. No.: 712,312

[22] Filed: Jun. 7, 1991

[30] Foreign Application Priority Data

Jun. 11, 1990 [JP] Japan .................. 2-152445

[51] Int. Cl.⁵ .............................. G03H 1/26
[52] U.S. Cl. ......................... 359/23; 359/21; 359/30; 359/32
[58] Field of Search ............ 359/1, 21, 22, 23, 30–33; 378/36

[56] References Cited

U.S. PATENT DOCUMENTS

| 4,421,380 | 12/1983 | McGrew | 359/23 |
| 4,429,946 | 2/1984 | Haines | 359/23 |
| 4,783,133 | 11/1988 | Chen | 359/23 |
| 4,834,476 | 5/1989 | Benton | 359/23 |
| 4,955,974 | 9/1990 | Rhodes et al. | 378/36 |
| 5,046,792 | 9/1991 | Zabka | 359/22 |
| 5,138,471 | 8/1992 | McGrew | 359/21 |

Primary Examiner—David P. Porta
Assistant Examiner—Kim-Kwok Chu
Attorney, Agent, or Firm—Jordan and Hamburg

[57] ABSTRACT

The present invention provides a method and apparatus for producing a hologram from a series of two-dimensional images horizontally different in line of sight from each other. The holographic apparatus employs original images produced by photographing an object from different directions, an object optical system which makes a light be incident upon original image to project an object beam onto photo-sensitive material, and a reference optical system which projects a reference beam of a same wavelength as the object beam toward the photo-sensitive material. The horizontal component of the object beam can be converged at a rear point i.e., a point of view at image reproduction, relatively distant from the photo-sensitive material on which a hologram is produced. When the hologram is reconstructed, a beam having the same wavelength as when recorded is converged at the rear point of view, so that the reconstructed image can be viewed in a same color free from any color shading.

13 Claims, 11 Drawing Sheets

THREE-DIMENSIONAL MULTIPLEX HOLOGRAM

BACKGROUND OF THE INVENTION

The present invention relates to a method and apparatus for producing a multiplex hologram.

Recently, it has been tried in various ways as an aid in medical diagnosis and surgery to produce in a three-dimensional multiplex holographic image a three-dimensional image reconstructed from tomographic images obtained by prevailing modern medical imaging techniques such as CT (computed tomography), MRI (magnetic resonance imaging) or the like.

Figure 1:
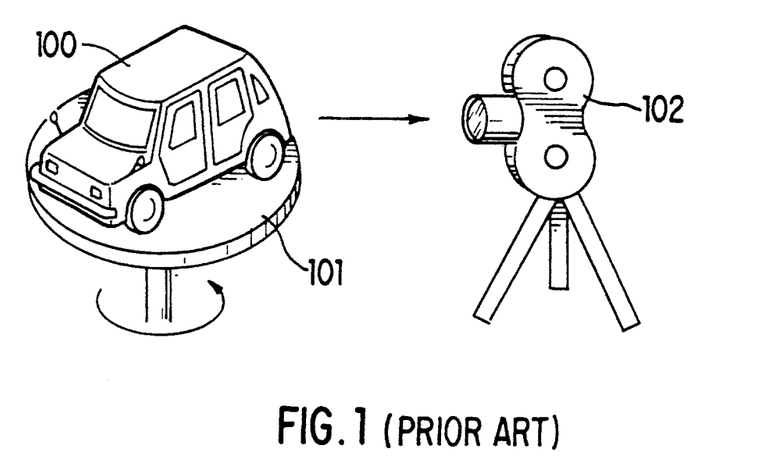
FIG. 1 is a schematic perspective view showing the prior art production of original images by means of a camera.

The multiplex hologram is produced in two steps. Namely, original images are photographed in the first step, and the photographed original images are used to record a hologram in the second step. More particularly, an object 100 is placed on a turntable 101, and it is photographed continuously by a camera 102 while the turntable is being rotated, as shown in FIG. 1. Note that for reconstructing a three-dimensional image using data obtained with CT or MRI, such original images are produced by processing the data by a computer beforehand, displaying the original image on a CRT (cathode ray tube), and photographing the image with camera. Next, the original images are used to produce a hologram. As a means of recording the original image, a variety of multiplex hologram (referred to as "hologram" hereinafter) production apparatuses has been developed. One such hologram production apparatuses (referred to as "holographic apparatus" hereinafter) is disclosed in, for example, U.S. Pat. No. 4,364,627.

Figure 2:
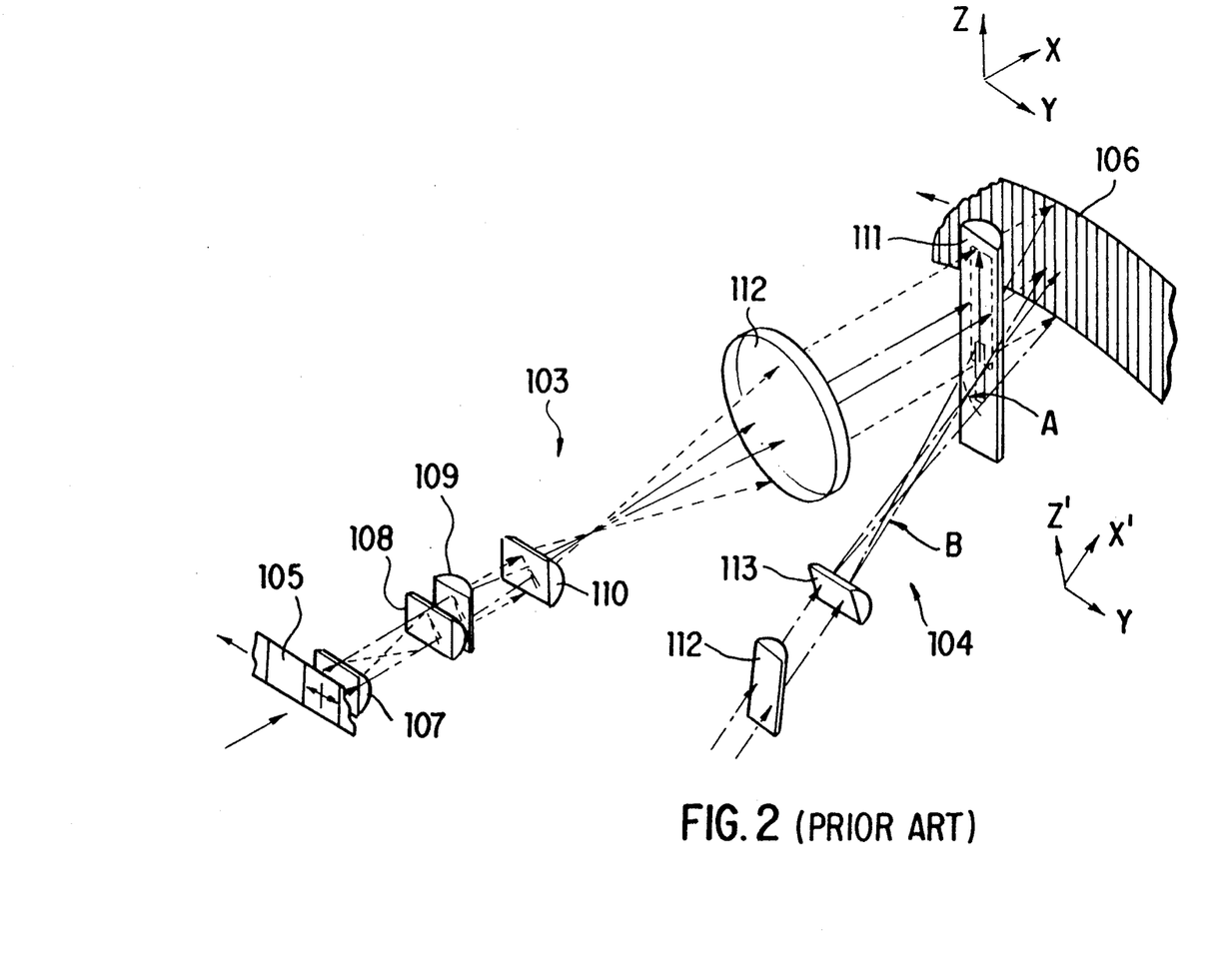
FIG. 2 is a schematic perspective view of a conventional holographic apparatus.

Such a holographic apparatus comprises a laser (not shown), an object optical system 103 and a reference optical system 104 as shown in FIG. 2. The object optical system 103 projects an original image 105 as an object beam onto a film 106. It is disposed on an optical path along which the laser beam travels, and it is further composed of first to fifth cylindrical lenses 107 to 111, and a spherical lens 112. The reference optical system 104 is so arranged as to project onto the surface of the film 106 a reference beam having the same wavelength as the object beam, make the reference beam interfere with the object beam similarly projected, and produce and record an interference image on the surface of the film 106. The reference optical system 104 consists of sixth and seventh cylindrical lenses 113 and 114 disposed on the optical path through which the reference beam passes, and shares the above-mentioned fifth cylindrical lens 111 with the object optical system 104.

Figure 3:
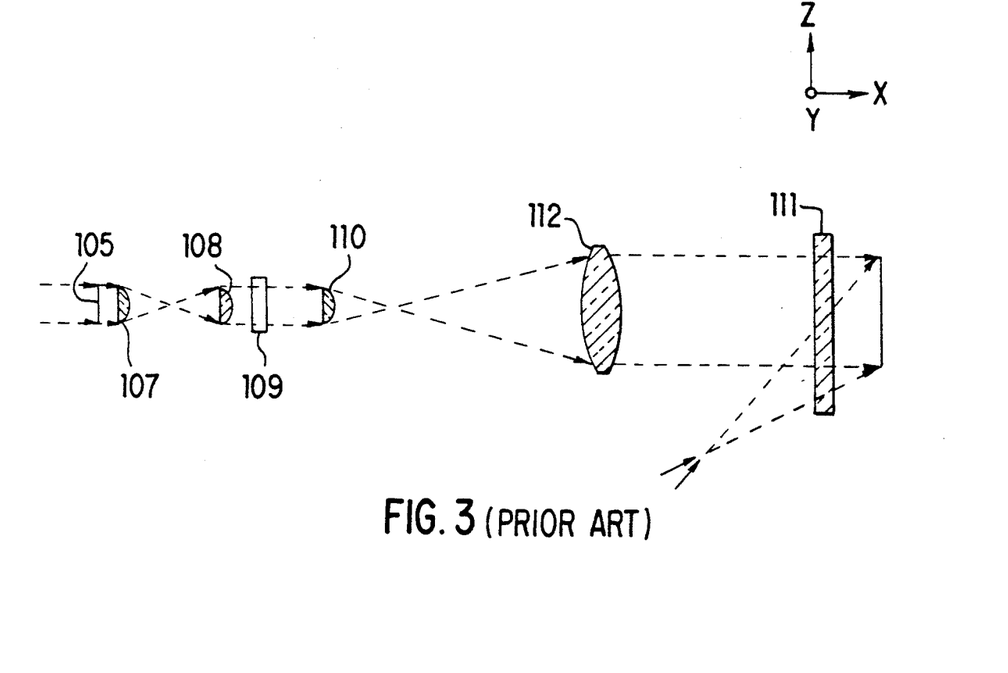
FIG. 3 is a plan view of the optical path in the object optical system of the apparatus shown in FIG. 2.
Figure 4:
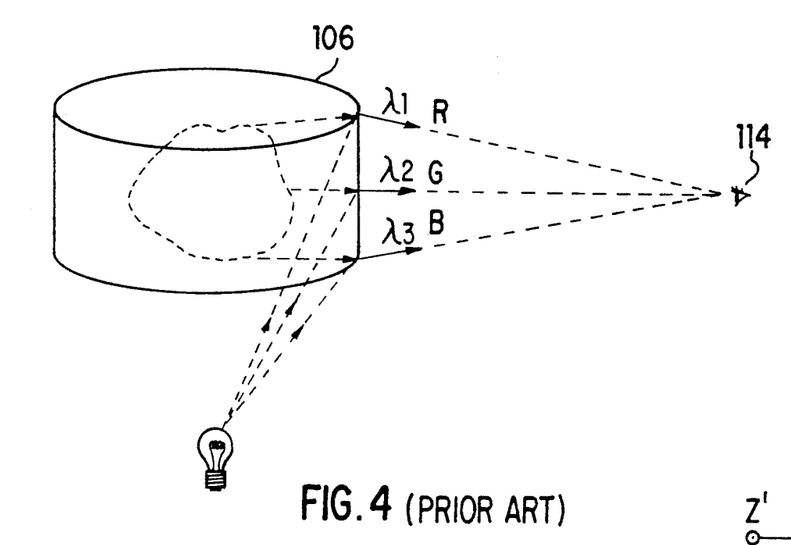
FIG. 4 is an explanatory drawing showing the reconstruction of a multiplex hologram produced by the apparatus shown in FIG. 2.

In the object optical system of the holographic apparatus of the above-mentioned construction, the object beam is shaped into parallel light beams after passing through the spherical lens 112 which then incident perpendicularly (in direction X) upon the surface of the film 106, as shown in, for example, FIG. 3. Therefore, when a white light beam, for example, is projected to a hologram produced by the holographic apparatus of such construction at the time of reconstruction as shown in FIG. 4, color shading is caused since the white light beam is incident upon, and diffracted at, the surface of the film 106 and the diffracted light beams are incident upon the viewer's eyes through angles which are slightly different from one another in a vertical direction toward the surface of the film 106. More particularly, a light beam in a red light region (R), that is, having a long wavelength λ1 is incident upon the viewer's eyes 114 from the upper end of the film 106 at which the light beam is diffracted through a large angle, a light beam in a blue region (B), that is, having a short wavelength λ3 is incident upon the viewer's eyes 114 from the lower end of the film 106 where the light beam is diffracted through a small angle, and further a light beam in a green light region (G) of intermediate wavelength λ2 is incident from the intermediate portion of the film 106. In other words, there will be reconstructed and viewed an image stained in colors slightly different from one another in the vertical direction toward the film 106. Hence, the factor of magnifications of the reconstructed image are different vertically according to the light regions, whereby the image is distorted. Therefore, when such a hologram in which a diseased spot is recorded is viewed for a medical diagnosis or examination, correct viewing cannot be done, possibly causing a wrong diagnosis.

Figure 5:
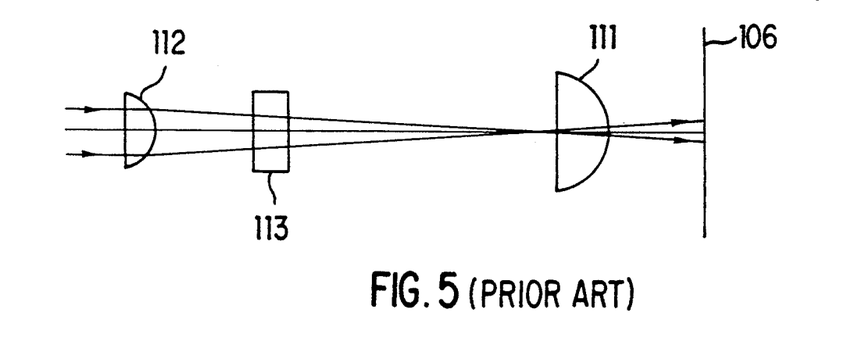
FIG. 5 is a schematic plan view of the optical path in the reference optical system in the apparatus shown in FIG. 2.

Also, in the reference optical system of the holographic apparatus of the aforementioned construction, the horizontal (Y-directional) component of the reference beam is divergently incident upon the surface of the film 106 through the cylindrical lens 111 from the lower portion slanted with respect to the surface of the film 106, as shown in FIG. 5.

However, when the hologram is reconstructed, the white light source lies at the center of a film formed in a cylindrical form, and the reconstructed light of the white light source beam is incident perpendicularly (crossing the direction Y) upon the film. So the recorded reference beam and reconstructed light beam are different in angle of incidence from each other, causing a distortion. Therefore, when a hologram produced by such conventional holographic apparatus is viewed for medical diagnosis or examination, the reconstructed image can not possibly be interpreted correctly.

SUMMARY OF THE INVENTION

The present invention has an object to overcome the above-mentioned drawbacks of the conventional techniques by providing a method and apparatus for producing a large hologram which has, when reconstructed, no possibility of color shading and distortion.

The above object is attained by providing a method for producing a hologram, comprising the steps of recording a hologram of a two-dimensional image on the surface of a photo-sensitive material by making interference with each other between an object beam converged horizontally on the surface of the photo-sensitive material or in the proximity thereof and vertically behind the surface of the photo-sensitive material, and a reference beam which is horizontally parallel and vertically divergent, respectively, on the surface of the photo-sensitive material, and laying holograms of two-dimensional images similarly recorded so as to mutually overlap or adjoin each other, thereby producing a holographic stereogram made of a series of two-dimensional images horizontally different in line of sight from each other.

The above object is also attained by providing a holographic apparatus, comprising a light source emitting a coherent beam, original images produced by photographing an object from different directions, an object optical system so constructed that horizontal light convergence is made on the surface of a photo-sensitive material rather than vertical light convergence, thereby making light be incident upon the original image and projecting the object beam onto the photo sensitive film, and a reference optical system having a portion common to the object optical system and which projects a beam horizontally parallel, and vertically devergent, onto the photo-sensitive material, thereby projecting a reference beam of a same wavelength as the object beam toward the photo-sensitive material, whereby the beam having passed through the object optical system interferes with the beam having passed through the reference optical system to record a holographic sterogram on the photo-sensitive material.

According to still another aspect of the present invention, a holographic apparatus is provided having a object optical system consisting of a first lens group as a vertical light-projection lens system, a second lens group as a horizontal light-projection lens system, a third lens group as a vertical light-projection lens system which is vertically long, and a fourth lens group as a horizontal light-projection lens system which is vertically long.

According to yet another aspect of the present invention, a holographic apparatus is provided in which the first lens group is composed of cylindrical lenses which converge only the vertical object beam having passed through the original image while having the horizontal component of the object beam go as a parallel beam.

According to yet another aspect of the present invention, a holographic apparatus is provided in which the second lens group is composed of cylindrical lenses which have the vertical component of the object beam having passed through the first lens group go as it is while converging the horizontal component.

According to another aspect of the present invention, a holographic apparatus is provided in which the third lens group is composed of cylindrical lenses which converge the vertical component of the object beam having passed through the second lens group.

According to a yet further aspect of the present invention, a holographic apparatus is provided in which the fourth lens group is composed of cylindrical lenses which act with the second lens group to converge the horizontal component of the object beam having passed through the third lens group, thereby projecting the original image narrowed horizontally onto the photo-sensitive material.

According to a still further object of the present invention, a holographic apparatus is provided in which the reference optical system consists of, sequentially from the beam incidence side, a fifth lens group disposed vertically of the optical axis of the reference optical system, a sixth lens group disposed horizontally of the optical axis, a seventh lens group disposed through a predetermined angle at a slant with respect to the optical axis, and also the fourth lens group, whereby the beam is projected as a parallel beam horizontally and as a devergent beam vertically, respectively, onto the photo-sensitive material.

According to a still further aspect of the present invention, a multiplex holographic apparatus is provided in which the fifth lens group diverges only the horizontal component of the reference beam and passes the vertical component as it is while the fifth, seventh and fourth lens groups project a beam onto the photo-sensitive material parallel to the horizontal direction.

According to yet another aspect of the present invention, a multiplex holographic apparatus is provided in which the sixth lens group diverges only the vertical component of the reference beam having passed through the fifth lens group to project the reference beam, as enlarged, onto the photo sensitive material.

According to another aspect of the present invention, a holographic apparatus is provided in which the seventh lens group converges to the front focus of the fourth lens group the reference beam diverged by the fifth lens group.

Figure 6:
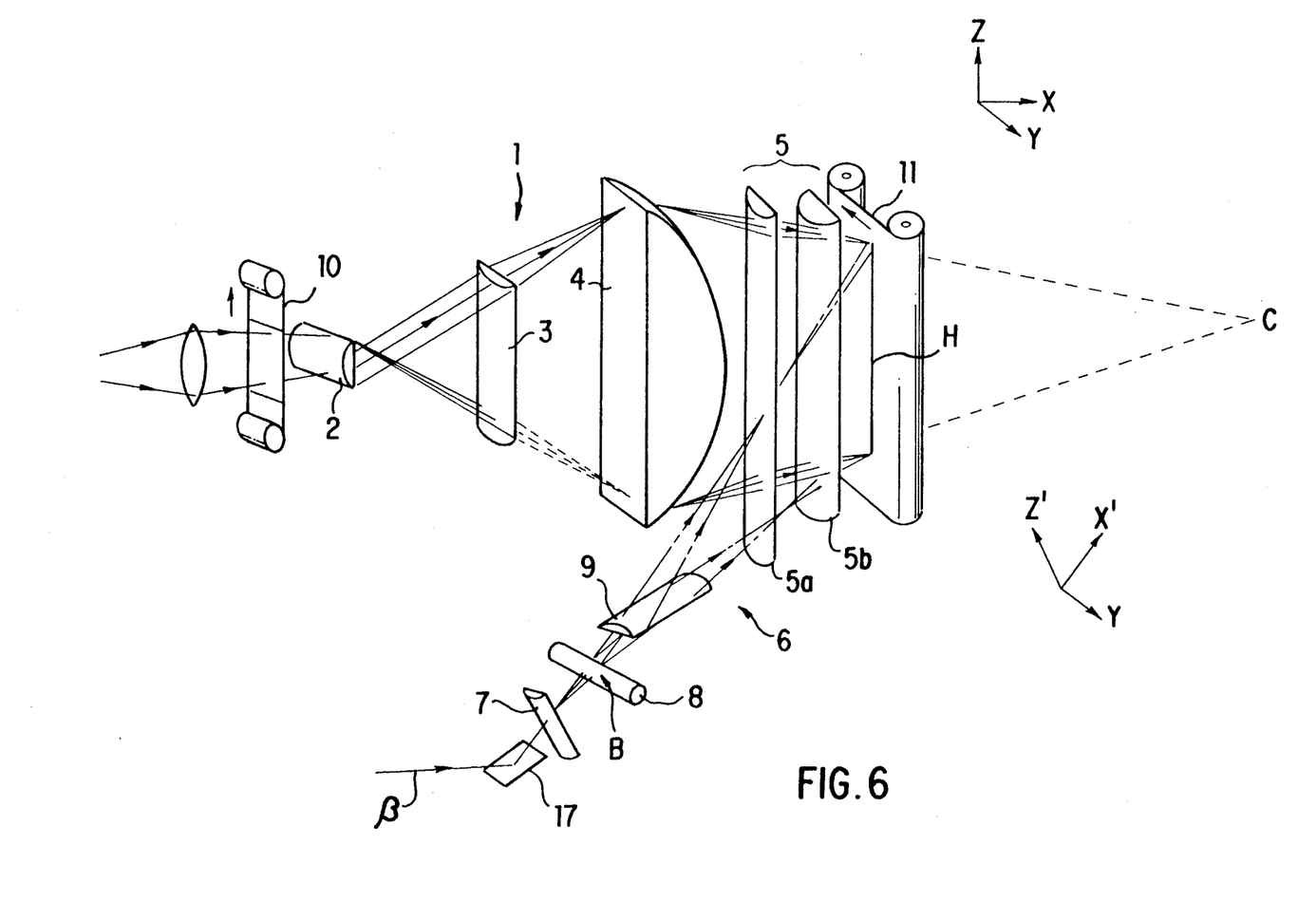
FIG. 6 is a schematic perspective view of the multiplex holographic apparatus according to the present invention.
Figure 10:
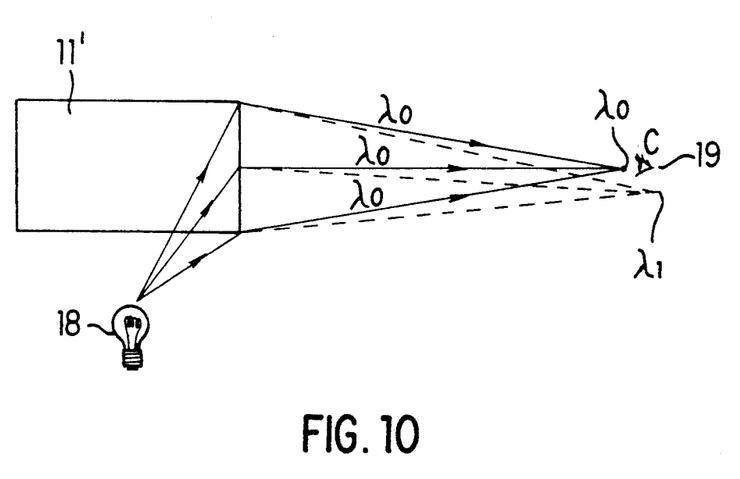
FIG. 10 is an explanatory drawing showing the reconstruction of a multiplex hologram recorded by the multiplex holographic apparatus shown in FIG. 6.

The multiplex holographic apparatus according to the present invention is constructed for the horizontal and vertical component of the object beam traveling through the object optical system to be converged at different points. Therefore, no spherical lenses are needed in the multiplex holographic apparatus according to the present invention. More particularly, the vertical component of the object beam can be converged at a rear point C, as shown in FIG. 6 i.e., it will become a point of view at image reconstruction relatively distant from the photo-sensitive material on which a hologram is produced. When the hologram thus produced is reconstructed, the beam having a same wavelength $\lambda 2$ as when recorded is converged at the point C, as shown in FIG. 10, so that the entire image can be viewed in a same color.

Also, when the beam has a different wavelength $\lambda 1$ from when recorded, it is also converged close to the point C. Hence, the entire image can be viewed in a same color provided that the viewer's eyes 19 are placed near the point C. Therefore, an image of a same color can be reconstructed.

Furthermore, in the reference optical system of the multiplex holographic apparatus, the horizontal component of the reference beam is projected as a parallel beam onto the photo-sensitive material by means of a fourth lens group disposed just before the photo-sensitive material. Thus, since the reference beam, when recorded, is made incident upon the photo-sensitive material at the same angle as the reproduced beam, the reconstructed image has no distortion in principle.

BRIEF DESCRIPTION OF THE DRAWINGS

FIG. 9(*a*) is a plan view of the reference optical system in the multiplex holographic apparatus shown in FIG. 6;

FIG. 9(*b*) is a plan view of the optical path at a point where the reference beam passes through a fourth lens group;

DESCRIPTION OF THE PREFERRED EMBODIMENTS

The preferred embodiments of the present invention will be further described with reference to the drawings.

FIG. 6 shows an embodiment of the multiplex holographic apparatus according to the present invention. The apparatus consists of an object optical system 1 comprising a first lens group 2, second lens group 3, third lens group 4 and fourth lens group 5, and a reference beam system 6 comprising a fifth lens group 7, sixth lens group 8, seventh lens group 9 and the fourth lens group 5 which is also a portion of the object optical system 1.

In the drawing, the reference numeral 10 indicates a film on which original images of an object to be viewed are recorded, and 11 indicates a film, which is a photosensitive material, on which the original images are recorded as a hologram.

Figure 7:
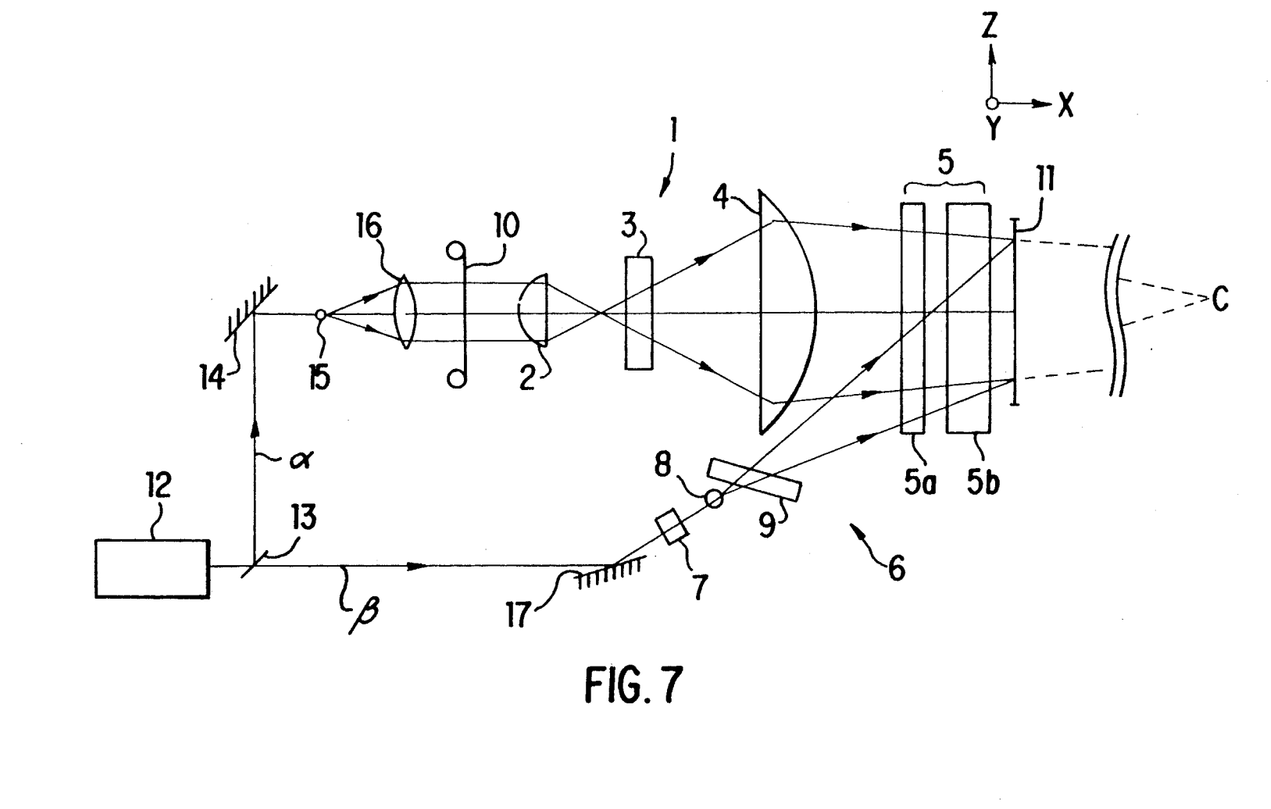
FIG. 7 is a side elevation of the optical path in the multiplex holographic apparatus shown in FIG. 6.

As shown in FIG. 7, the object optical system 1 in this embodiment comprises a helium-neon (He-Ne) laser 12 of 632.8 nm wavelength which emits a laser beam (referred to as "object beam $\alpha$" hereinafter), a beam splitter 13 which splits the object beam $\alpha$ from the laser 12, a mirror 14 which reflects the object beam $\alpha$ split by the beam splitter 13, a divergent lens 15 and collimation lens 16, through which the object beam $\alpha$ reflected by the mirror 14 is passed and refracted, and the first lens group 2 to fourth lens group 5. Further, the object optical system 1 is so constructed that the convergence points in the vertical and horizontal directions, respectively, are adjusted independently and separately by the first and third lens groups 2 and 4 and by the second and fourth lens groups 3 and 5, respectively, so that the convergence point C for the vertical (Z direction) component of the object beam $\alpha$ is different from the convergence point C' for the horizontal (Y direction) component thereof, especially, for the vertical component to be converted at a rear point (point C) behind the film 11, thereby preventing any color shading from occurring when the reconstructed image is viewed at the convergence point.

The first lens group 2 forms together with the third lens group 4 a vertical-beam converging and projecting lens for converging the vertical (Z direction) component of the object beam $\alpha$. In this embodiment, one flat-convex cylindrical lens having a generally semi-circular cross section is used as an anamorphic lens, whose axis is orientated parallel to the horizontal (Y) direction. The first lens group 2 converges between itself and the third lens group 4 the vertical (Z direction) component of the object beam $\alpha$ passed through the film 10 carrying original images and makes it be incident, as diverged, upon the third lens group 4, as shown in FIG. 7.

Figure 8:
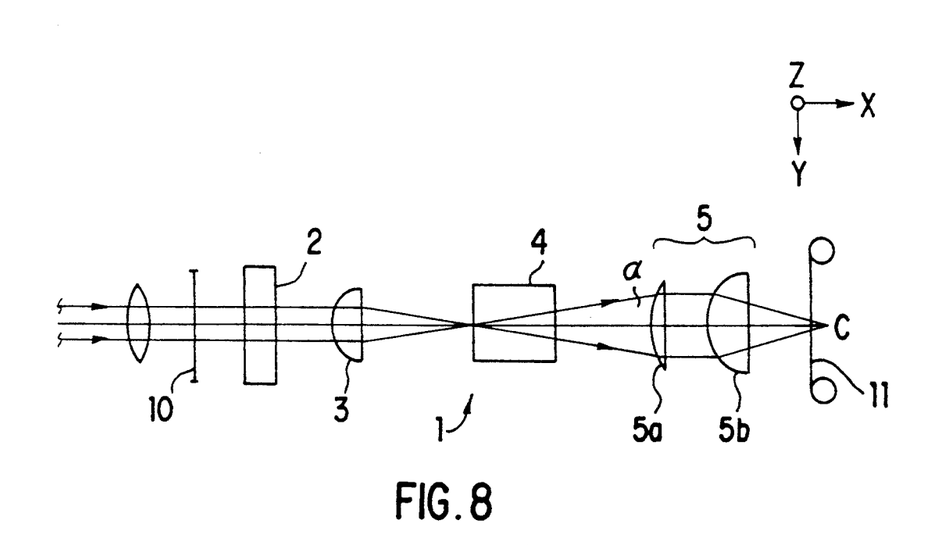
FIG. 8 is a plan view of the optical path in the multiplex holographic apparatus shown in FIG. 6.

The second lens group 3 forms together with the fourth lens group 5 a horizontal-beam converging and projecting lens for converging the horizontal (Y direction) component of the object beam $\alpha$. In this embodiment, one flat-convex cylindrical lens having a generally semi-circular cross section is used as an anamorphic lens, whose axis is orientated parallel to the vertical (Z) direction. The second lens group 3 converges to a predetermined position between itself and the fourth lens group 5 the horizontal (Y direction) component of the object beam $\alpha$ passed through the first lens group 2 and makes it be incident, as diverged, upon the fourth lens group 5, as shown in FIG. 8.

The third lens group 4 forms a vertical-beam converging and projecting lens for converging the vertical (Z direction) component of the object beam $\alpha$ and projecting an image as diverged in the vertical direction (Z) onto the film 11. In this embodiment, one flat-convex cylindrical lens is used as an anamorphic lens, which is vertically long, has a generally semi-circular cross section and whose axis is orientated parallel to the horizontal direction. The third lens group 4 projects the object beam $\alpha$ as converged onto the film 11 and converges it at a predetermined position (point C) behind the film 11.

The fourth lens group 5 forms a horizontal-beam converging and projecting lens for converging the horizontal (Y direction) component of the object beam $\alpha$ and projecting each original image as horizontally narrowed onto the film 11. In this embodiment, two cylindrical lenses, first and second, 5a and 5b, are used as an anamorphic lens, which are vertically long, have a generally semi-circular cross section and whose axes are orientated parallel to the vertical direction. The fourth lens group 5 converges the horizontal (Y direction) component of the object beam $\alpha$ passed through the third lens group 4 to a position C' just behind the film 11, namely, to a position nearer the film 11 than the convergence point C for the vertical component, as shown in FIG. 8.

Figure 9A:
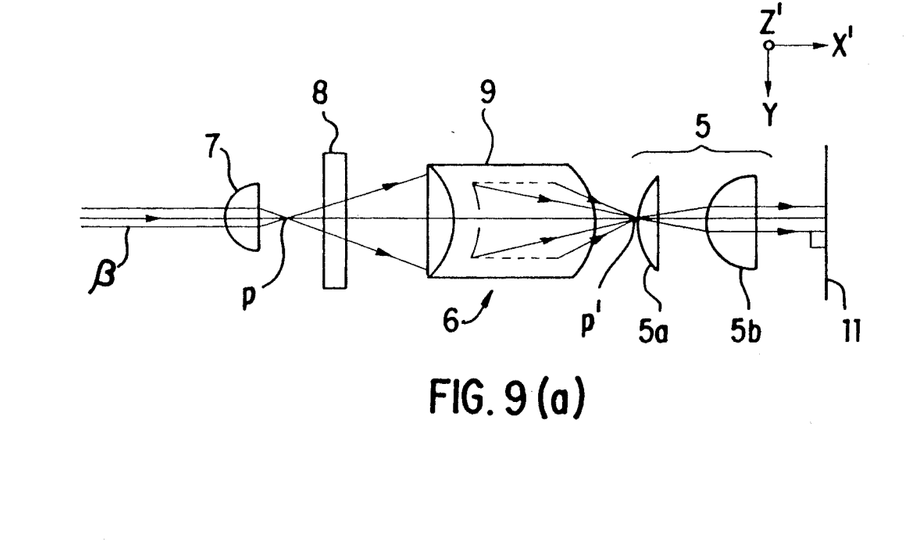

As shown in FIG. 7, the reference optical system 6 in this embodiment is composed of a mirror 17 which reflects obliquely upward the laser beam (referred to as "reference beam $\beta$" hereinafter) emitted from the helium-neon (He-Ne) laser 12 passed through the beam splitter 13, the previously-mentioned fifth lens group 7 to seventh lens group 9 by which the reference beam $\beta$ reflected by the mirror 17 is passed and refracted, and the fourth lens group 5 which is also a portion of the object optical system 1. To prevent the image recorded on the film 11 from incurring any distortion, the reference optical system 6 is so constructed that the horizontal component of the reference beam $\beta$ is adjusted by the fifth and seventh lens groups 7 and 9 in order to project, parallel to the horizontal direction (Y) and perpendicularly onto the film 11, the reference beam $\beta$ passed and refracted by the fourth lens group 5, as shown in FIG. 9 (a).

The fifth lens group 7 forms a divergent lens which does not refract the vertical (Z direction) component of the reference beam $\beta$ but diverges only the horizontal (Y direction) component and which also works in cooperation with the seventh and fourth lens groups 9 and 5 to project the reference beam $\beta$ to the film 11 perpendicularly thereto and parallel to the horizontal direction. In this embodiment, one flat-convex cylindrical lens is used as an anamorphic lens, which has a generally semi-circular cross section and whose axis is orientated parallel to the vertical (Z') direction. The fifth lens group 7 is disposed in a predetermined position to which the reference beam $\beta$ passed through the fourth lens group 5 is parallel. Namely, the seventh lens group 9 disposed at a predetermined position provides behind the seventh lens group 9 a convergence point (P') conjugate with the convergence point (P) provided by the fifth lens group 7. The convergence point P' coincides with one of the focal points of the fourth lens group 5.

The sixth lens group 8 forms a divergent lens which projects the reference beam $\beta$ as diverged vertically onto the film 11 while diverging only the vertical (Z direction) component of the reference beam $\beta$ passed through the fifth lens group 7. In this embodiment, one cylindrical lens whose axis is orientated parallel to the horizontal direction (Y) is used as an anamorphic lens. The sixth lens group 8 is to record an image, i.e., a hologram, on the film 11 by taking the anamorphic lens as the reference point. The sixth lens group 8 is disposed at a position where the light source to be used for subsequent image reconstruction is to be installed, the sixth lens group 8 being disposed between the fifth and seventh lens groups 7 and 9.

Figure 9B:
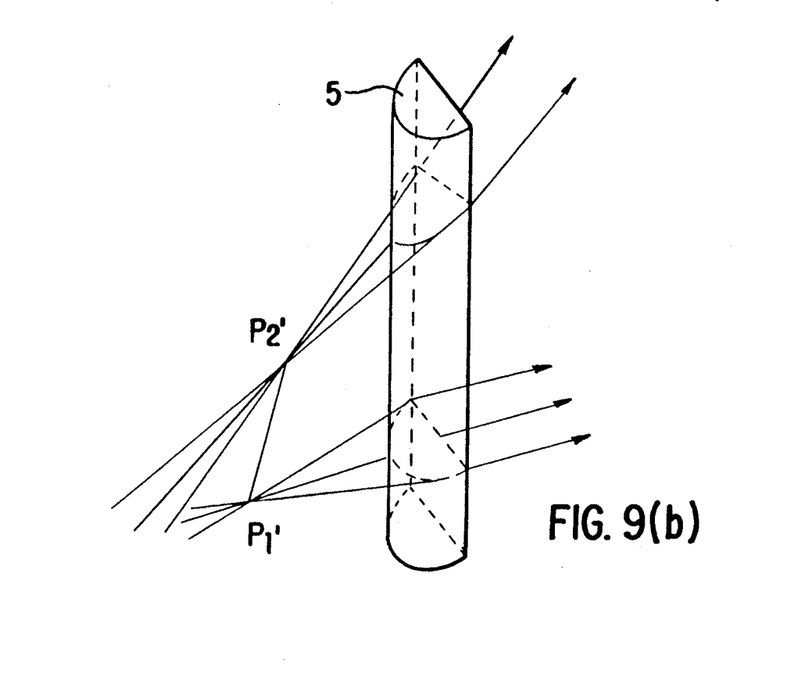

The seventh lens group 9 forms a converging lens for convergence of the horizontal component of the reference beam $\beta$ diverged by the fifth lens group 7 to the focal point P' of the fourth lens group 5. In this embodiment, one flat-convex cylindrical lens is disposed to have the conjugate points in the plane of the fifth lens group 7 or in the proximity thereof, and in the convex cylindrical plane or in the proximity thereof, of the first cylindrical lens 5a of the fourth lens group 5. As shown in FIG. 7, the seventh lens group 9 in this embodiment is so constructed that the reference beam $\beta$ passed through the second cylindrical lens 5b is made incident, as a parallel beam, upon the film 11 at each height thereof with the reference beam adjusted by slanting the axial direction a predetermined angle from the vertical direction (Z) with respect to the optical axis of the reference beam $\beta$, because the vertical component of the reference beam $\beta$ is diverged vertically. Namely, for the reference beam $\beta$ passed through the fourth lens group 5 (5a and 5b) to be incident as a parallel beam upon the film 11 at each height as shown in FIG. 9 (b), the angle of incidence of the reference beam $\beta$ upon the fourth lens group 5 varies depending upon the respective height of incidence, the refraction by the fourth lens group 5 varies depending upon the respective height of incidence upon the fourth lens group 5 and a line connected between the points P1' and P2' at each height must be slanted with respect to the Z axis. To slant the line P1'-P2' with respect to the Z axis for this reason, the seventh lens group 9 is slanted a predetermined angle from the Z axis.

Hence, according to this embodiment, an image incurring no distortion is recorded on the film 11 as a multiplex hologram which, when reconstructed, incurs no distortion.

Also according to this embodiment, when a white light beam is projected as a reconstructed light beam onto a film 11' from a light source 18 at the time of reconstruction, as shown in FIG. 10, the light beam is diffracted at each point in the vertical direction (Z) of the film 11' and the diffracted light beam incident upon the eyes 19 of the viewer will have a same wavelength (namely, a same color). That is, a reconstructed image is producible which incurs no color-caused distortion.

The method for producing a hologram using the multiplex holographic apparatus according to the present invention will now be discussed.

Figure 11:
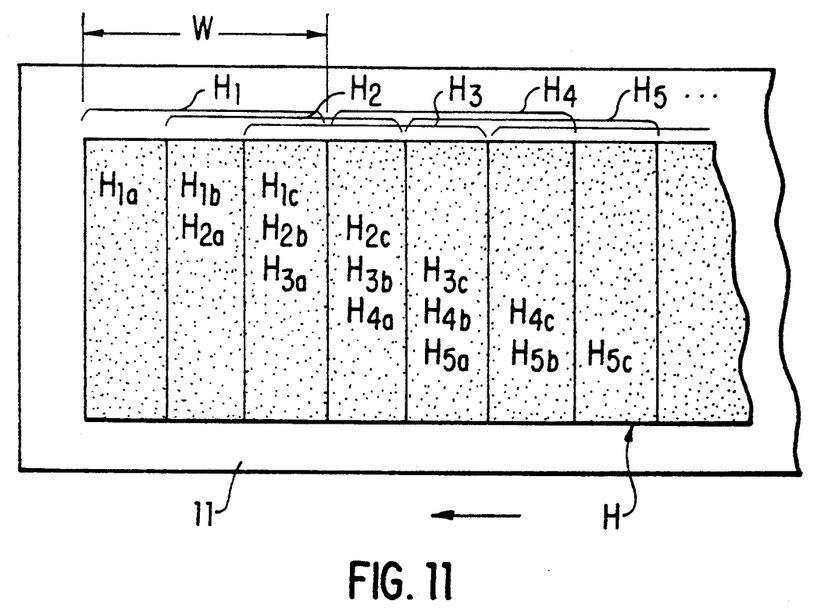
FIGS. 11 and 12 are explanatory drawings, respectively, of holograms produced by the method according to the present invention.

I. When the film 10 carries many image frames:

The optical system shown in FIG. 1 is used to produce a hologram H (whose width is assumed to be W) on the film 11 from two-dimensional images photographed on the film 10. If the film 10 carries many image frames, displacing the film 11 with a pitch of, for example, W/3 causes, as shown in FIG. 11, area $H_{2a}$ at the left portion (W/3) of the second hologram record to overlap area $H_{1b}$ at the middle (W/3) of the first hologram record, and also causes area $H_{2b}$ at the middle (W/3) of the second hologram record and area $H_{3a}$ at the left portion (W/3) of the third hologram record to overlap area $H_{1c}$ at the right (W/3) of the first hologram record. In other words, three kinds of holograms of two-dimensional images are recorded.

II. When film 10 does not carry so many image frames:

Similarly, the optical system shown in FIG. 6 is used to produce a hologram H (whose width is assumed to be W) on the film 11 from two-dimensional images photographed on the film 10. As shown in, for example, FIG. 12, the same hologram as recorded in the first hologram production area $H_1$ is also produced in the second and third hologram production areas $H_2$ and $H_3$.

Figure 12:
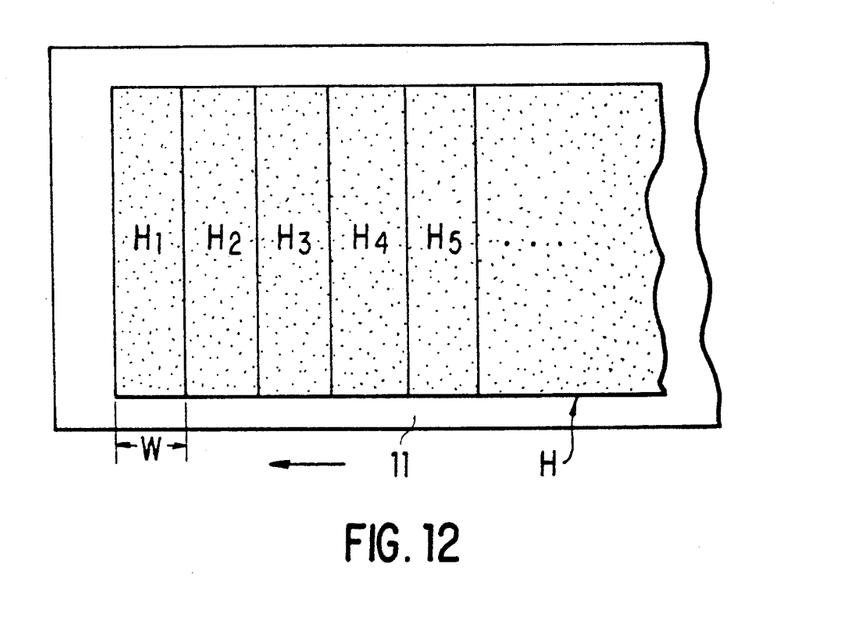

Namely, in this embodiment, holograms of the same image are produced and recorded adjacent to one another in three areas in each block.

It should be noted that the number of holograms of the same image recorded as overlapping one another or adjacent to each other (number N of hologram elements) can be calculated from a value ($N_1$) derived from dividing the total length of a film on which holograms are to be produced by the width W of holograms to be produced and the number ($N_2$) of frames of images previously photographed on the film. Namely, the number N can be obtained from the following equation:

$$N = N_1/N_2$$

The number of hologram elements (N) is not limited to three as in this embodiment, but should preferably be two to seven.

As described in the foregoing, the multiplex holographic apparatus according to the present invention is so constructed that different convergence points are provided for horizontal and vertical components, respectively, of an object beam traveling through an object optical system hologram. Thus, the optical system needs no spherical lenses. More particularly, since the horizontal component of the object beam can be converged at a point (a point of view at reproduction) behind a photo-sensitive material on which a multiplex hologram can be recorded and which is relatively distant therefrom, only a beam having a same wavelength (a same color) can be made incident upon the photo-sensitive material when the reconstructed beam is incident upon the point of view. Thus, a reconstructed image incurring no color-caused distortion can be obtained.

Also, in the reference optical system of the multiplex holographic apparatus according to the present invention, the horizontal component of the reference beam is made incident upon and projected onto the photo-sensitive material by means of fifth, seventh and fourth lens groups after passing through the fourth lens group, so that there is no possibility that the image on the photo-sensitive material incurs any distortion. Thus, a correct reconstructed image can be obtained which has no distortion.

What is claimed is:

1. A multiplex holographic apparatus comprising:
   a light source emitting a coherent beam;
   original images produced by photographing an object from different directions;

mirror means for splitting said coherent beam into an object beam having a horizontal component and a vertical component and a reference beam having a horizontal component and a vertical component, said object beam being passed through said original images;

a photo-sensitive material having a hologram-recording surface for reconstructing said original images as a hologram;

an object optical system, for passing said object beam therethrough, comprising a first lens group as a vertical light-projection lens system, a second lens group as a horizontal light-projection lens system, a third vertically-long lens group as a vertical light-projection lens system, and a fourth vertically-long lens group as a horizontal light-projection lens system, said object optical system converging the horizontal component of the object beam on said surface of said photo-sensitive material while not converging the vertical component of the object beam on said surface, whereby said object beam is made incident upon said original images and then projected onto the photo-sensitive material; and a reference optical system, for passing said reference beam therethrough, having a portion common to said object optical system, for projecting said reference beam horizontally parallel and vertically divergent onto said surface of said photo-sensitive material, thereby projecting a reference beam of a same wavelength as said object beam toward said photo-sensitive material, whereby said object beam passed through said object optical system interferes with said reference beam passed through said reference optical system to record a holographic stereogram on said photo-sensitive material.

2. A multiplex holographic apparatus according to claim 1, wherein said first lens group comprises cylindrical lenses for converging only the vertical component of the object beam while providing the horizontal component of the object beam as a parallel beam.

3. A multiplex holographic apparatus according to claim 1, wherein the second lens group comprises cylindrical lenses for not interfering with the vertical component of the object beam after passage through the first lens group while converging the horizontal component of the object beam after passage through the first lens group.

4. A multiplex holographic apparatus according to claim 1, wherein the third lens group comprises cylindrical lenses for converging the vertical component of the object beam after passage through the second lens group.

5. A multiplex holographic apparatus according to claim 1, wherein the fourth lens group comprises cylindrical lenses for converging the horizontal component of the object beam after passage through the third lens group, thereby projecting a horizontally-narrowed original image onto the photo-sensitive material.

6. A multiplex holographic apparatus according to claim 1, wherein said reference optical system has an optical axis and comprises, sequentially in a direction towards said photo-sensitive material, a fifth lens group disposed vertically of said optical axis, a sixth lens group disposed horizontally of said optical axis, a seventh lens group disposed on a slant at a predetermined angle with respect to said optical axis, and also said fourth lens group, whereby said reference beam is projected as a parallel beam horizontally and as a divergent beam vertically onto said photo-sensitive material.

7. A multiplex holographic apparatus according to claim 6, wherein said fifth lens group diverges only the horizontal component of said reference beam, and said fifth, seventh and fourth lens groups project a horizontally-parallel beam onto said photo-sensitive material.

8. A multiplex holographic apparatus according to claim 6, wherein the sixth lens group diverges only the vertical component of the reference beam after passage through the fifth lens group to project the diverged reference beam onto the photo-sensitive material.

9. A multiplex holographic apparatus according to claim 7, wherein the fourth lens group has a front focus, and the seventh lens group converges to said front focus of said fourth lens group the reference beam diverged by the fifth lens group.

10. A method for producing a multiplex hologram, comprising the steps of:

recording a hologram of a two-dimensional image on a surface of a photo-sensitive material by creating interference with each other between 1) an object beam converged horizontally at a first location in the proximity of the surface of said photo-sensitive material and converged vertically at a second location different from said first location and behind said surface of said photo-sensitive material, and 2) a reference beam projected horizontally parallel and vertically divergent onto the surface of the photo-sensitive material, and similarly recording additional holograms of two-dimensional images such that said holograms mutually overlap each other, thereby producing a holographic stereogram made of a series of two-dimensional images horizontally different in line of sight from each other.

11. A method as in claim 10, wherein said object beam is converged horizontally on the surface of said photo-sensitive material.

12. A method for producing a multiplex hologram, comprising the steps of:

recording a hologram of a two-dimensional image on a surface of a photo-sensitive material by creating interference with each other between 1) an object beam converged horizontally at a first location in the proximity of the surface of said photo-sensitive material and converged vertically at a second location different from said first location and behind the surface of said photo-sensitive material, and 2) a reference beam projected horizontally parallel and vertically divergent onto the surface of the photo-sensitive material, and similarly recording additional holograms of two-dimensional images such that said holograms mutually adjoin each other, thereby producing a holographic stereogram made of a series of two-dimensional images horizontally different in line of sight from each other.

13. A method as in claim 12, wherein said object beam is converged horizontally on the surface of said photo-sensitive material.

* * * * *